United States Patent
Al-Ejel

(10) Patent No.: US 12,379,502 B2
(45) Date of Patent: Aug. 5, 2025

(54) SENSOR PERISCOPE FOR EXTENDING VIEWING ANGLES

(71) Applicant: GM Cruise Holdings LLC, San Francisco, CA (US)

(72) Inventor: Omar Al-Ejel, San Francisco, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 156 days.

(21) Appl. No.: 18/469,028

(22) Filed: Sep. 18, 2023

(65) Prior Publication Data

US 2025/0093516 A1 Mar. 20, 2025

(51) Int. Cl.
*G01S 17/931* (2020.01)
*B60W 60/00* (2020.01)
*G01S 7/481* (2006.01)
*G01S 17/42* (2006.01)

(52) U.S. Cl.
CPC ....... *G01S 17/931* (2020.01); *B60W 60/0015* (2020.02); *G01S 7/481* (2013.01); *G01S 17/42* (2013.01); *B60W 2420/408* (2024.01)

(58) Field of Classification Search
CPC ........ G01S 17/931; G01S 7/481; G01S 17/42; G01S 7/4817; G01S 7/497; G01S 7/4972; B60W 60/0015; B60W 2420/408
See application file for complete search history.

(56) References Cited

U.S. PATENT DOCUMENTS

| | | | | |
|---|---|---|---|---|
| 9,069,080 | B2* | 6/2015 | Stettner | B60W 30/08 |
| 10,267,908 | B2* | 4/2019 | Luders | G01S 17/10 |
| 11,249,182 | B2* | 2/2022 | Luders | G01S 7/4026 |
| 12,099,123 | B2* | 9/2024 | Geng | G01S 7/4802 |
| 12,130,383 | B2* | 10/2024 | Gassend | G01S 17/08 |
| 12,225,301 | B2* | 2/2025 | Hwang | G01S 17/86 |
| 2021/0278502 | A1* | 9/2021 | Impola | G01S 17/87 |
| 2023/0243977 | A1* | 8/2023 | Buoniconti, IV | G01S 7/4817 356/4.01 |

\* cited by examiner

*Primary Examiner* — Richard M Camby
(74) *Attorney, Agent, or Firm* — CANTOR COLBURN LLP

(57) ABSTRACT

The present disclosure generally relates to autonomous vehicles, and, more specifically, to systems and techniques for extending a sensor's capabilities by extending the field of view into one or more blind spots located in the environment of an autonomous vehicle. In some aspects, a method of the disclosed technology includes: determining a location of a first blind spot that is within range of a LIDAR sensor; positioning the reflective object according to a first pose; triggering the LIDAR sensor to collect sensor data during a scan cycle performed by the LIDAR sensor, wherein at least one portion of a light beam emitted from the LIDAR sensor is reflected off the reflective object at the first pose toward the location of the first blind spot. Systems and machine-readable media are also provided.

20 Claims, 6 Drawing Sheets

SENSOR PERISCOPE FOR EXTENDING VIEWING ANGLES

BACKGROUND

1. Technical Field

The present disclosure generally relates to autonomous vehicles (AVs), and, more specifically, to systems and techniques for extending a sensor's capabilities by extending the field of view into one or more blind spots located in the environment of an AV.

2. Introduction

Sensors are commonly integrated into a wide array of systems and electronic devices such as, for example, camera systems, mobile phones, autonomous systems (e.g., autonomous vehicles, unmanned aerial vehicles or drones, autonomous robots, etc.), computers, smart wearables, and many other devices. The sensors allow users to obtain sensor data that measures, describes, and/or depicts one or more aspects of a target such as an object, a scene, a person, and/or any other targets. For example, a light ranging and detection (LIDAR) sensor can be used to determine ranges (variable distance) of one or more targets by directing a laser to a surface of an entity (e.g., a person, an object, a structure, an animal, etc.) and measuring the time for light reflected from the surface to return to the LIDAR.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
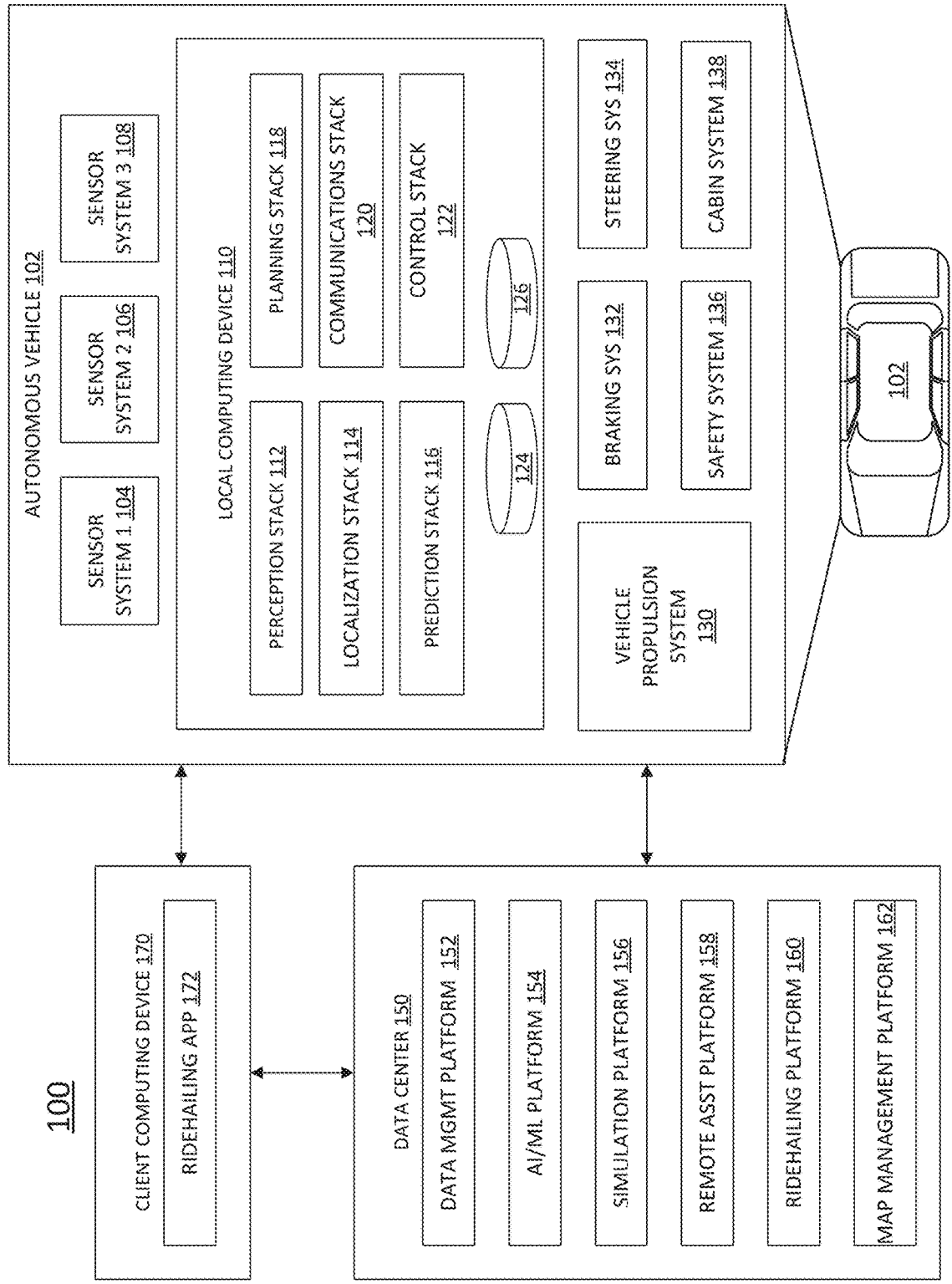
FIG. 1 illustrates an example system environment that can be used to facilitate autonomous vehicle (AV) dispatch and operations, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspects of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Autonomous vehicles (AVs) can navigate roadways without a human driver based on sensor signals generated by multiple sensor systems, as discussed in more detail below. One type of sensor that can be used by AVs to help navigate roadways is a light detection and ranging (LIDAR) sensor. In some examples, a LIDAR sensor can emit light waves into the environment that can reflect from surrounding objects and return to the sensor. The LIDAR sensor can calculate the distance that the light waves travelled based on how long it takes for a light wave to return to the sensor. In some examples, the LIDAR sensor can rotate a certain number of degrees, such as 360 degrees, as it emits and receives the light waves, and this process can be repeated to create a map of the AV's environment. The AV can subsequently use this map of the surrounding environment to navigate the environment without a human driver.

LIDAR sensors can be physical sensor objects that can be mounted to the exterior body of an AV at one or more locations on or about the exterior body of the AV. The number of LIDAR sensors (and the location of each LIDAR sensor on the body of the AV) can be chosen to provide the AV with the most complete coverage of the surrounding environment. In some examples, an AV can include six to eight LIDAR sensors, but there is no limit to the number of LIDAR sensors that can be used to implement the disclosed invention. The frequency of a LIDAR sensor can be defined as the number of times that the LIDAR sensor rotates per second while collecting data and/or the amount of time it takes the LIDAR sensor to complete a scan from a beginning position and/or field-of-view (FOV) of the LIDAR sensor during the scan to an end position and/or FOV of the LIDAR sensor during the scan. In practice, the higher the frequency of a LIDAR sensor (e.g., the faster the LIDAR sensor rotates, thereby increasing the number of iterations of emitting and receiving reflected light waves per second), the more data that the LIDAR sensor can collect and/or the faster that the LIDAR sensor can collect data. For example, the more times the LIDAR sensor rotates per second, the more data the LIDAR sensor can capture.

However, while a LIDAR sensor can collect large amounts of data while operating at a suitable frequency in order to help the AV map and understand its environment, in some scenarios it can be difficult to physically position the LIDAR sensors around the body of the AV in a manner that provides the AV with complete coverage of the entire surrounding environment. For example, one area of the AV's surrounding environment that can be difficult to properly capture within a LIDAR sensor's FOV is the ultra nearfield area located directly adjacent the body of the AV. The ultra nearfield area can be defined as the area directly adjacent to the body of the AV that extends from the body of the AV to about three to five meters outward. However, the size and shape of the ultra nearfield area is not limited to the area directly adjacent to the body of the AV extending outward three to five meters, and can be any area proximate to the body of the AV. In some cases, this ultra nearfield area around the body of the AV can include one or more blind spots within the LIDAR sensor FOV, and therefore objects within the ultra nearfield area blind spots may not be detected by the LIDAR sensors. A blind spot in the LIDAR sensor FOV can be undesirable since the AV itself can be unaware of a person or object within the ultra nearfield area that can lead to unsafe outcomes as the AV navigates its environment.

Described herein are systems, apparatuses, processes (also referred to as methods), and computer-readable media (collectively referred to as "systems and techniques") for extending a LIDAR sensor's capabilities to allow the LIDAR sensor FOV to extend into one or more blind spots located in the AV's environment. For example, a reflective object (such as, for example, a mirror) can be appended to a LIDAR sensor so that signals emitted from the LIDAR sensor can reflect off the reflective object toward the blind spot. Those signals can then reflect off any objects located in the LIDAR FOV blind spot, reflect back off the reflective object and be captured by the LIDAR sensor receiver for subsequent processing. This process can allow a LIDAR sensor with one or more blind spots within its FOV to scan for objects within the one or more blind spots using the reflective object. Further, scanning blind spots (such as, for example, blind spots located in the ultra nearfield area of the AV's environment) can be more important in some road scenarios than others. For example, a parked AV can be more likely to be unaware of an object located within the blind spot of the ultra nearfield area of the AV's environment (such as, for example, a passenger approaching the AV for a pickup), than an AV travelling on a roadway utilizing all the sensors where an object is less likely to approach the AV in an unnoticed way. Therefore, the systems, apparatuses, processes described herein can also determine when and if the reflective object should be extended, or whether the reflective object should remain inactive thereby permitting normal scanning operation of the LIDAR sensor.

FIG. 1 is a diagram illustrating an example autonomous vehicle (AV) environment 100, according to some examples of the present disclosure. One of ordinary skill in the art will understand that, for AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

Prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

Planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

Control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

Communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

Data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ride-hailing service (e.g., a ridesharing service), a delivery service, a remote/roadside assistance service, street services (e.g., street mapping, street patrol, street cleaning, street metering, parking reservation, etc.), and the like.

Data center 150 can send and receive various signals to and from the AV 102 and the client computing device 170. These signals can include sensor data captured by the sensor systems 104-108, roadside assistance requests, software updates, ride-hailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ride-hailing platform 160, and a map management platform 162, among other systems.

Data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ride-hailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

Simulation platform 156 can enable testing and validation of the algorithms, machine learning models, neural networks, and other development efforts for the AV 102, the remote assistance platform 158, the ride-hailing platform 160, the map management platform 162, and other platforms and systems. Simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

Ride-hailing platform 160 can interact with a customer of a ride-hailing service via a ride-hailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 172. The client computing device 170 can be a customer's mobile computing device or a computing device integrated with the AV 102 (e.g., the local computing device 110). The ride-hailing platform 160 can receive requests to pick up or drop off from the ride-hailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some embodiments, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ride-hailing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 6.

Figure 2:
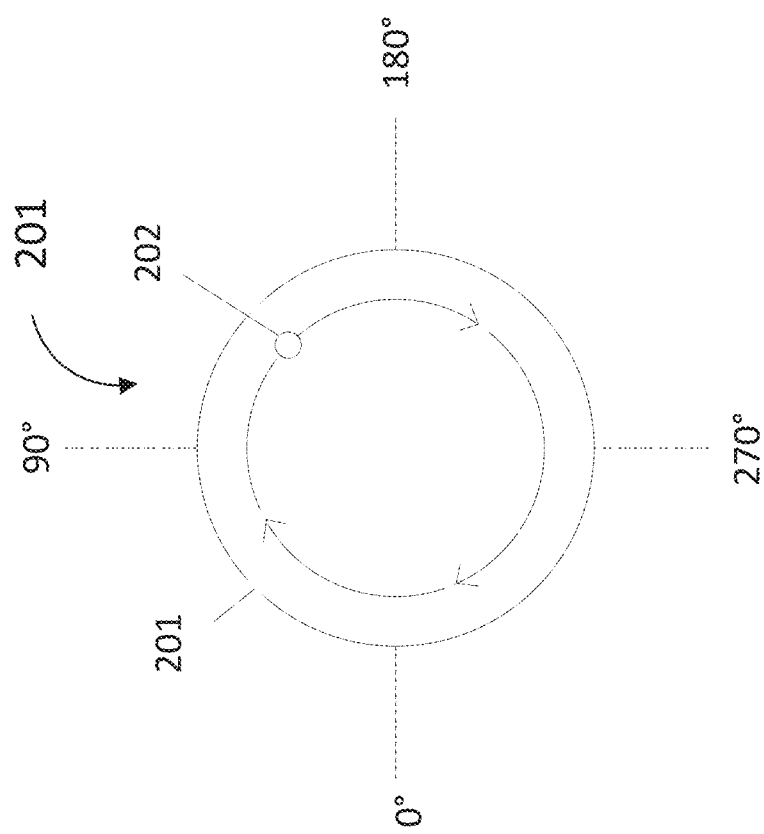
FIG. 2 illustrates a diagram of an example LIDAR sensor that can be used by AVs to help navigate roadways, according to some examples of the present disclosure.

FIG. 2 illustrates a diagram of an example LIDAR sensor 201. As described above, a LIDAR sensor 201 is one type of sensor that can be used by AVs to help navigate roadways. In some examples, the LIDAR sensor 201 includes an emitter/receiver 202 that can emit light waves into the environment that can bounce off surrounding objects and return to the sensor. The LIDAR sensor 201 can calculate the distance that the light waves travelled based on how long it takes for a pulse to return to the emitter/receiver 202. As illustrated by the arrows in FIG. 2, the emitter/receiver 202 within the LIDAR sensor 201 can rotate as it is emitting and receiving the light waves, and this process can be repeated to create a map of the AV's environment. Although the arrows in FIG. 2 are illustrated rotating in the clockwise direction, the emitter/receiver 202 can rotate in any direction.

Moreover, while the examples provided herein describe rotation as the movement of a LIDAR sensor during a LIDAR scan/cycle, the systems and techniques described herein can be applied to any LIDAR sensor that moves and/or changes its field-of-view (FOV) in any other manner while collecting data for a cycle of movement and/or FOV changes. For example, a LIDAR sensor on a platform can be configured to collect data as it moves along one or more planes with or without rotating about an axis. Further, while the LIDAR sensors and LIDAR data described herein are described in the context of a vehicle (e.g., an AV), the vehicle use case is merely one illustrative example provided for explanation purposes. The systems and techniques described herein can be implemented with LIDAR sensors and LIDAR data in any other context or use case, such as LIDAR sensors on an aircraft, a robotic device, and/or any other LIDAR application.

In general, the more times the emitter/receiver 202 of the LIDAR sensor 201 fully rotates (e.g., the higher the frequency of the LIDAR sensor 201), the more data that the LIDAR sensor 201 can collect. For example, the more times the emitter/receiver 202 rotates per unit of time, the more data the LIDAR sensor 201 can capture, thereby providing more accurate and/or complete information about the surrounding environment. A higher frequency LIDAR sensor 201 can also be useful when an AV is travelling at a high rate of speed (e.g., at a speed above a threshold) since objects proximate to the AV can be located within the field of view of the LIDAR sensor 201 for a shorter period of time than if the AV was traveling slower, due to the higher speed of the AV. However, the physical shape and placement of the LIDAR sensor 201 about the exterior body of the AV can create one or more blind spots in the FOV of the LIDAR sensor 201. As discussed above, one example blind spot that can be created due to the shape and placement of the LIDAR sensor 201 is the ultra nearfield area proximate the body of the AV.

Figure 3:
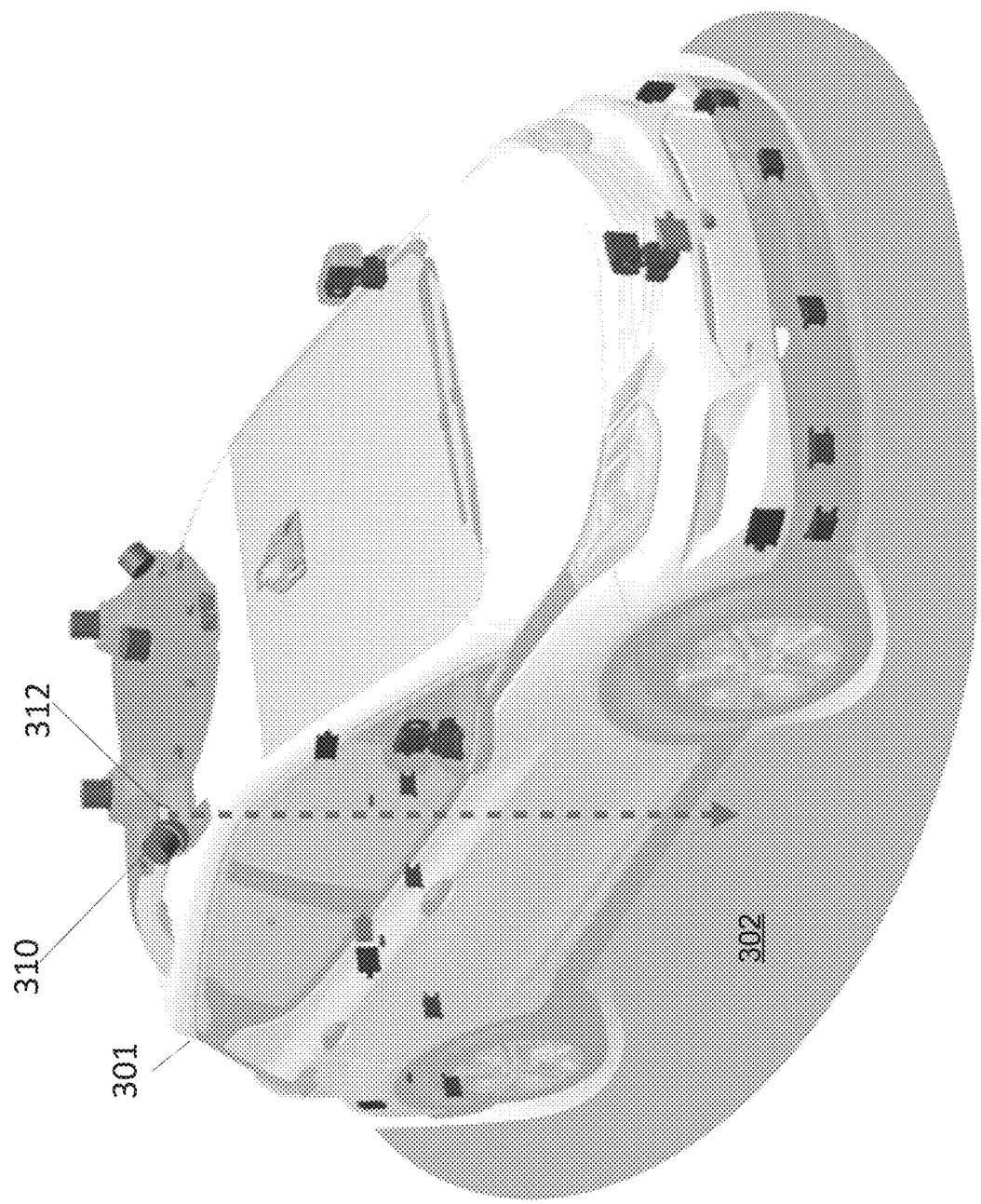
FIG. 3 illustrates a perspective view of an example AV with at least one LIDAR sensor mounted to the exterior body of the AV, according to some examples of the present disclosure.

FIG. 3 illustrates a perspective view of an example AV 301 with at least one LIDAR sensor 310 mounted to the exterior body of the AV 301. In the example illustrated in FIG. 3, area 302 can be a blind spot that the LIDAR sensors (including LIDAR sensor 310) mounted to AV 301 are unable to capture within the LIDAR sensor FOV. While area 302 can be a blind spot for the attached LIDAR sensor 310, in some cases it may not be a blind spot for one or more other sensors mounted to AV 301 (e.g., sensor systems 104-108). For example, a camera sensor can have a FOV that overlaps with area 302. However, even though area 302 may be covered by at least one other sensor (such as a camera sensor, for example), in some configurations it can be useful that area 302 is not a blind spot for LIDAR sensor 310 because LIDAR sensor 310 can provide more accurate depth and distance information for the AV. That is, while a camera sensor (for example), may detect an object within blind spot area 302, the camera sensor may not provide precise distance information to the AV computing system as accurately as LIDAR sensor 310.

As further illustrated in FIG. 3, LIDAR sensor 310 can be proximate (e.g., near or attached) to a reflective object 312. Reflective object 312 can be any object of suitable size and shape capable of reflecting light waves emitted from LIDAR sensor 310 in a desired direction. Reflective object 312 can include mechanical components that facilitate extending and/or rotating (and other movements) of the reflective object 312. In some examples, reflective object 312 can be a mirror. In some examples, the reflective object 312 can be flat, while in other examples the reflective object 312 can be concave or convex. In some examples, more than one reflective object 312 can be attached to LIDAR sensor 310 (in a manner similar to a periscope, for example). As described further below, in some examples, reflective object 312 can comprise one or more non-reflective portions, reflective object 312 can also be foldable so that it can be folded down and out of view of LIDAR sensor 310, and subsequently actuated to stand up when needed.

In the scenario depicted in FIG. 3, blind spot area 302 can be outside the normal FOV of LIDAR sensor 310, and therefore any object within blind spot area 302 will not be detected by LIDAR 310. That is, light pulses emitted from LIDAR sensor 310 will not reflect off any portion of blind spot area 302. This can be due to the physical shape and location of the LIDAR sensor 310, among other nonlimiting reasons. However, if the AV determines that it needs to determine whether objects are located within blind spot area 302, reflective object 312 can be actuated to open so that light pulses emitted from LIDAR 310 can reflect off of reflective object 312 in the direction indicated by the dotted arrow in FIG. 3. The reflective object 312 can be actuated into a position (at a specific angle, for example), so that light pulses emitted from LIDAR 310 can reflect off the reflective object 312 and toward the desired portion of the blind spot area 302. The light pulses would reflect off of any object and back to reflective object 312, where the light pulses can further be reflected back to the receiver of LIDAR sensor 310.

The computing system of AV 301 can subsequently process the received signals to determine whether an object is located in blind spot area 302 (by employing ray tracing mathematics, among others, for example). In some aspects, the computing system may use the position (e.g., orientation, angle, pose, etc.) of the reflective object 312 relative to the LIDAR sensor 310 to determine a location of any detected object within blind spot area 302. The AV computing system can determine the location and angle of reflective object 312 using high precision motors, for example. Although not illustrated herein, in some scenarios, more than one reflective object can be used in a manner similar to a periscope creating a system of reflective objects. In this scenario, the computing system of the AV can keep track of the location and angles of each reflective object in order to properly calculate the location of any object detected in blind spot area 302. In some examples, the location and angle of each reflective object can be determined during operation of the LIDAR sensor 310 accounting for any situation where one or more reflective objects are inadvertently moved. For example, a reflective object can get bumped, but the resulting data will continue to be accurate.

Each LIDAR sensor (such as LIDAR sensor 310, for example) can be equipped or coupled to one (or more than one) reflective object(s) 312. In some cases, each reflective object 312 can be attached to a high precision motor permitting the reflective object 312 to rotate around the body of LIDAR 312 into any location and further adjust the reflective object 312 to any desired angle. In some examples, the reflective object 312 can be actuated when needed and positioned as needed during operation of the AV. For example, during a customer pickup, once the AV 301 has stopped to pickup one or more passengers, the reflective object 312 can be actuated into a position to allow the LIDAR sensor 310 to detect a person standing by (or entering) the doors of AV 301. In some cases, AV 301 may determine whether a person is standing within the blind spot area 302 of AV 301 using LIDAR reflections obtained via reflective object 312. In other examples, the reflective object 312 can be actuated into position to assist the LIDAR sensor 310 during a back-up maneuver in a tight space, or when performing a U-turn, among other examples. Although not illustrated in FIG. 3, reflective object 312 can also be attached to a rod or an extendable arm to further assist the LIDAR sensor 310 in scanning blind spot area 302.

In some examples, LIDAR sensor 310 and reflective object 312 can be pre-calibrated prior to AV 301 navigating a route. In other examples, the LIDAR sensor 310 and reflective object 312 can be calibrated during operation of AV 301. For example, if the reflective object 312 has been inadvertently moved, the addition of two or more non-reflective portions on the face of the reflective object 312 can permit calibration to be done during operation of AV 301. Additionally mathematical processes can be used to calibrate non-flat (i.e., convex or concave) reflective objects and/or multiple reflective objects (i.e., periscope example).

Figure 4:
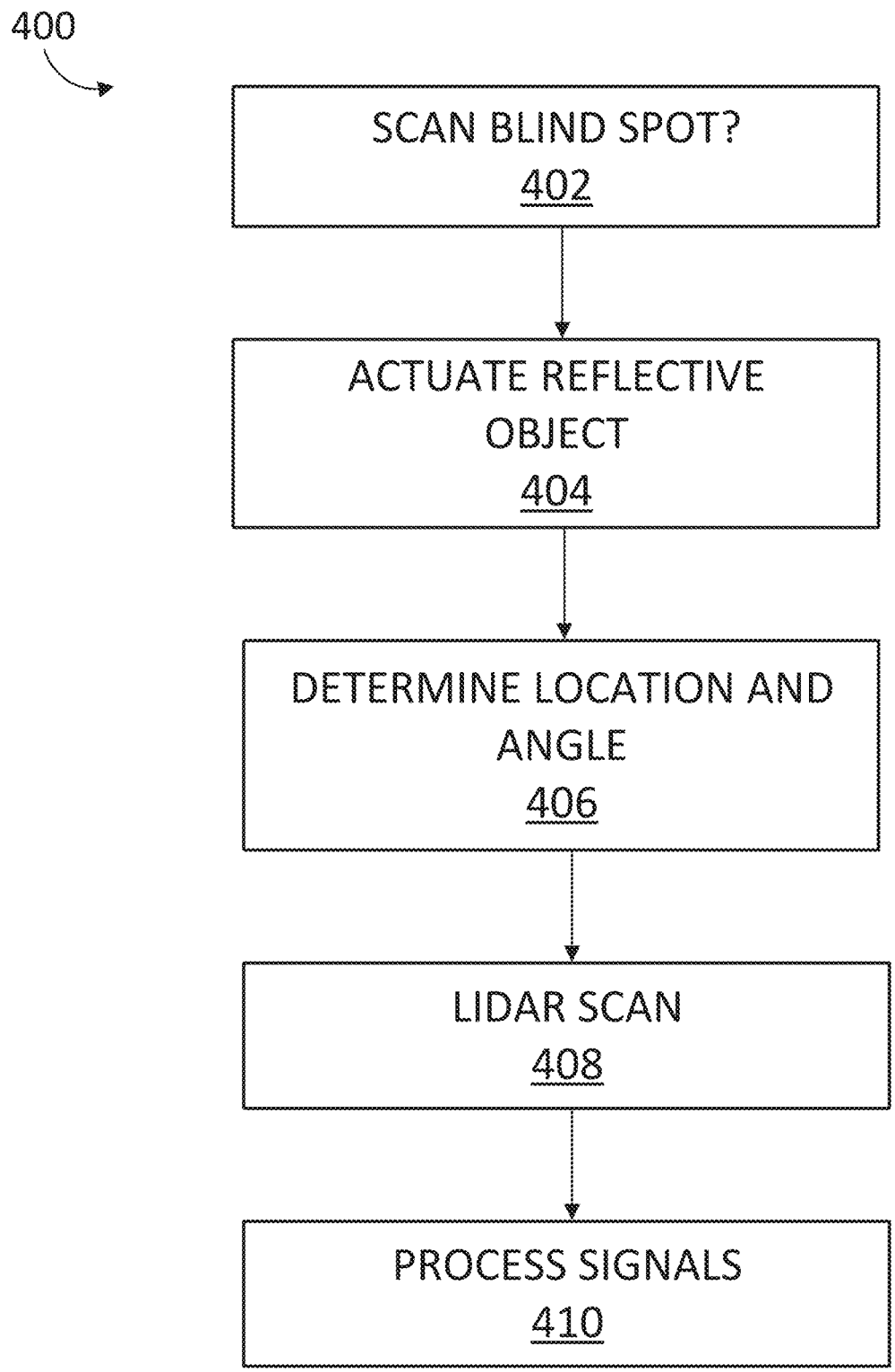
FIG. 4 illustrates a flow diagram of an example process for extending the capabilities of a LIDAR sensor by extending the FOV into one or more blind spots using a reflective object, according to some examples of the present disclosure.

FIG. 4 illustrates a flow diagram of an example process 400 for extending the capabilities of a LIDAR sensor (e.g., LIDAR sensor 310) by extending the FOV into one or more blind spots using an reflective object. At block 402, the process 400 can include determining, by an AV (e.g., AV 301), if a present scenario merits detection of a possible object potentially located within a blind spot area proximate the AV. For example, during a customer pickup, after the AV 301 has stopped to pickup one or more passengers, it can be desirable to detect a person standing by (or entering) the doors of AV 301 that may be located within the blind spot area 302. In other examples, it can be desirable to detect any person or object that may be in close proximity to the AV during a back-up maneuver in a tight space, or when performing a U-turn, among other examples. The AV 301 can determine any situation or scenario where it can be desirable to know if any object or objects are present within the blind spot area. It can be desirable to have the AV determine appropriate scenarios for when it would like to scan the blind spot area because the reflective object that is used can block other portions of the LIDAR scan in some situations thereby creating other blind spots that can be more troublesome during other operations of the AV. Therefore, it can be advantageous to only extend the reflective object when appropriate.

At block 404, the process 400 can include actuating the reflective object (e.g., reflective object 312) into place about the LIDAR sensor (e.g., LIDAR sensor 310). In some examples, the reflective object can be a mirror. In some examples, the reflective object can be any suitable reflective object. In some examples, the reflective object can be flat, while in other examples the reflective object can be concave or convex. In some examples, more than one reflective object can be attached to LIDAR sensor 310 (in a manner similar to a periscope, for example). Additionally, in some examples, reflective object can comprise one or more non-reflective portions. Reflective object 312 can also be foldable so that it can be folded down and out of view of LIDAR sensor 310, and subsequently actuated to stand up when needed.

The reflective object (such as, for example, a mirror) can be appended to a LIDAR sensor so that signals emitted from the LIDAR sensor can reflect off the reflective object toward the blind spot. Those signals can then reflect off any objects located in the LIDAR FOV blind spot, reflect back off the reflective object and be captured by the LIDAR sensor receiver for subsequent processing. This process can allow a LIDAR sensor with one or more blind spots within its FOV to scan for objects within the one or more blind spots using the reflective object.

At block 406, the process 400 can include determining the location and angle of the actuated reflective object (e.g., reflective object 312). In some examples, the computing system may determine and utilize the angle of the reflective object 312 relative to the LIDAR sensor 310 in order to determine an exact location of any detected object within blind spot area 302. The AV computing system can determine the location and angle of reflective object 312 using high precision motors, for example. In some scenarios, more than one reflective object can be used in a manner similar to a periscope creating a system of reflective objects. In this scenario, the computing system of the AV can keep track of the location and angles of each reflective object in order to properly calculate the location of any object detected in blind spot area 302. In some examples, the location and angle of each reflective object can be determined during operation of the LIDAR sensor 310 accounting for any situation where one or more reflective objects are inadvertently moved. For example, an reflective object can get bumped, but the resulting data will continue to be accurate since the location and angle can be determined using high precision motors, for example.

At block 408, the process 400 can include performing one or more LIDAR sensor scans with the one or more reflective objects in proper place. As discussed above, a LIDAR sensor can emit light waves into the environment that can reflect from surrounding objects and return to the sensor. The LIDAR sensor can calculate the distance that the light waves travelled based on how long it takes for a light wave to return to the sensor. In some examples, the LIDAR sensor can rotate a certain amount of degrees, such as 360 degrees, as it emits and receives the light waves, and this process can be repeated to create a map of the AV's environment. When the reflective object has been actuated into place, signals emitted from the LIDAR sensor during a scan can reflect off the reflective object toward the blind spot. Those signals can then reflect off any objects located in the LIDAR FOV blind spot, reflect back off the reflective object and be captured by the LIDAR sensor receiver for subsequent processing. This process can be repeated for each rotation of the LIDAR sensor.

At block 410, the process 400 can include processing, at the AV computing system, the signals captured by the LIDAR sensor (e.g., LIDAR sensor 310) to determine whether any objects are located within the blind spot area (e.g., blind spot area 302) and further determining their shape and location within the environment. For example, the perception stack (e.g., perception stack 112) of the AV can enable the AV 301 to detect and classify objects and determine their current locations, speeds, directions, and the like based on those received signals. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Figure 5:
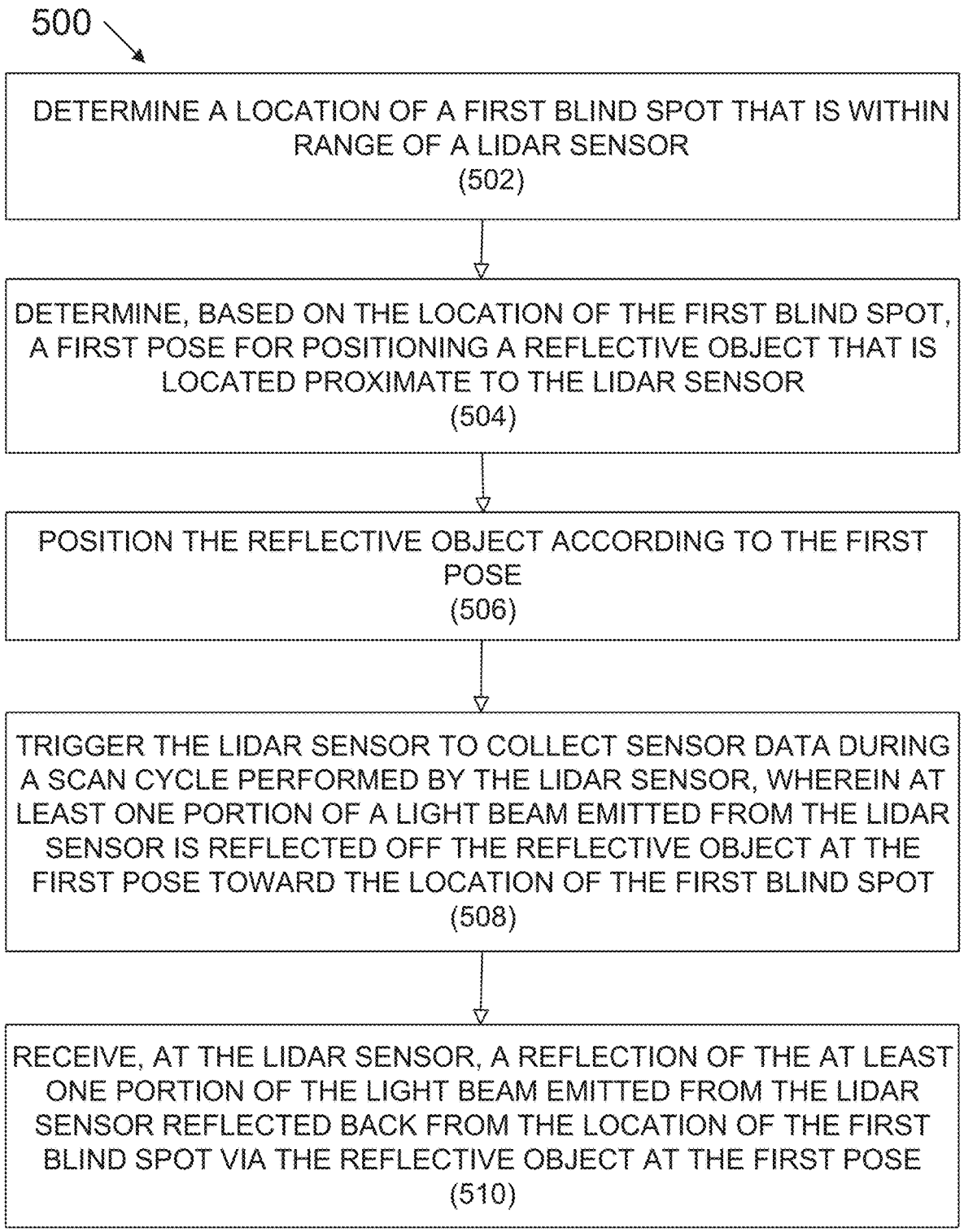
FIG. 5 illustrates a flow diagram of an example process for extending a LIDAR sensor's capabilities by extending the FOV into one or more blind spots located in the environment of an AV, according to some aspects of the disclosed technology.

FIG. 5 illustrates a flow diagram of an example process 500 for extending a LIDAR sensor's (e.g., LIDAR sensor 310) capabilities by extending the FOV into one or more blind spots located in the environment of an AV (e.g., AV 301). At block 502, the process 500 can include determining a location of a first blind spot that is within range of a LIDAR sensor (e.g., LIDAR sensor 310). As described above, the ultra nearfield area around the body of the AV can include one or more blind spots within the LIDAR sensor FOV, and therefore objects within the ultra nearfield area blind spots may not be detected by the LIDAR sensors during normal operations. A blind spot in the LIDAR sensor FOV can be undesirable since the AV itself can be unaware of a person or object within the ultra nearfield area that can lead to unsafe outcomes as the AV navigates its environment. For example, during a customer pickup, after the AV has stopped to pickup one or more passengers, it can be desirable to detect a person standing by (or entering) the doors of AV that may be located within the blind spot. In other examples, it can be desirable to detect any person or object that may be in close proximity to the AV during a back-up maneuver in a tight space, or when performing a U-turn, among other examples. The AV 301 can determine any situation or scenario where it can be desirable to know if any object or objects are present within the blind spot.

At block 504, the process 500 can include determining, based on the location of the first blind spot, a first pose for positioning a reflective object (e.g., reflective object 312) that is located proximate to the LIDAR sensor (e.g., LIDAR sensor 310). As discussed above, the reflective object (such as, for example, a mirror) can be appended to a LIDAR sensor so that signals emitted from the LIDAR sensor can reflect off the reflective object toward the blind spot. Those signals can then reflect off any objects located in the LIDAR FOV blind spot, reflect back off the reflective object and be captured by the LIDAR sensor receiver for subsequent processing. This process can allow a LIDAR sensor with one or more blind spots within its FOV to scan for objects within the one or more blind spots using the reflective object. In some cases, the computing system may determine and use the angle of the reflective object 312 relative to the LIDAR sensor 310 in order to determine an exact location of any detected object within blind spot area 302. The AV computing system can determine the location and angle of reflective object 312 using high precision motors, for example. In some scenarios, more than one reflective object can be used in a manner similar to a periscope creating a system of reflective objects. In this scenario, the computing system of the AV can keep track of the location and angles of each reflective object in order to properly calculate the location of any object detected in blind spot area 302. In some examples, the location and angle of each reflective object can be determined during operation of the LIDAR sensor 310 accounting for any situation where one or more reflective objects are inadvertently moved. For example, an reflective object can get bumped, but the resulting data will continue to be accurate since the location and angle can be determined using high precision motors, for example.

At block 506, the process 500 can include positioning the reflective object (e.g., reflective object 312) according to the first pose. Each LIDAR sensor (such as LIDAR sensor 310, for example) can be equipped with one (or more than one) reflective objects. Each reflective object 312 can be attached to a high precision motor permitting the reflective object 312 to rotate around the body of LIDAR 312 into any location and further adjust the reflective object 312 to any desired angle. In some examples, the reflective object 312 can be actuated when needed and positioned as needed during operation of the AV. For example, during a customer pickup, once the AV 301 has stopped to pickup one or more passengers, the reflective object 312 can be actuated into a position to allow the LIDAR sensor 310 to detect a person standing by (or entering) the doors of AV 301. In some cases, the AV may determine whether a person is standing within the blind spot of the AV. In other examples, the reflective object can be actuated into position to assist the LIDAR sensor during a back-up maneuver in a tight space, or when performing a U-turn, among other examples. Additionally, as discussed above, reflective object can also be attached to a rod or an extendable arm to further assist the LIDAR sensor in scanning blind spot.

At block 508, the process 500 can include triggering the LIDAR sensor (e.g., LIDAR sensor 310) to collect sensor data during a scan cycle performed by the LIDAR sensor, wherein at least one portion of a light beam emitted from the LIDAR sensor is reflected off the reflective object (e.g., reflective object 312) at the first pose toward the location of the first blind spot. As discussed above, the LIDAR sensor can emit light waves into the environment that can reflect from surrounding objects and return to the sensor. The LIDAR sensor can calculate the distance that the light waves travelled based on how long it takes for a light wave to return to the sensor. In some examples, the LIDAR sensor can rotate a certain amount of degrees, such as 360 degrees, as it emits and receives the light waves, and this process can be repeated to create a map of the AV's environment. When the reflective object has been actuated into place, signals emitted from the LIDAR sensor during a scan can reflect off the reflective object toward the blind spot. Those signals can then reflect off any objects located in the LIDAR FOV blind spot, reflect back off the reflective object and be captured by the LIDAR sensor receiver for subsequent processing. This process can be repeated for each rotation of the LIDAR sensor.

At block 510, the process 500 can include receiving, at the LIDAR sensor (e.g., LIDAR sensor 310), a reflection of the at least one portion of the light beam emitted from the LIDAR sensor reflected back from the location of the first blind spot via the reflective object (e.g., reflective object 312) at the first pose. Once the reflective object has been actuated into a position (at a specific angle, for example), the light pulses emitted from LIDAR 310 can reflect off the reflective object 312 and toward the desired portion of the blind spot area 302. Subsequently, the light pulses can reflect off of any object and back to reflective object 312, where the light pulses can further be reflected back to the receiver of LIDAR sensor 310. The computing system of the AV can subsequently process the received signals to determine whether an object is located in blind spot area (by employing ray tracing mathematics, among others, for example). For example, the perception stack (e.g., perception stack 112) of the AV can enable the AV to detect and classify objects and determine their current locations, speeds, directions, and the like based on those received signals. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Figure 6:
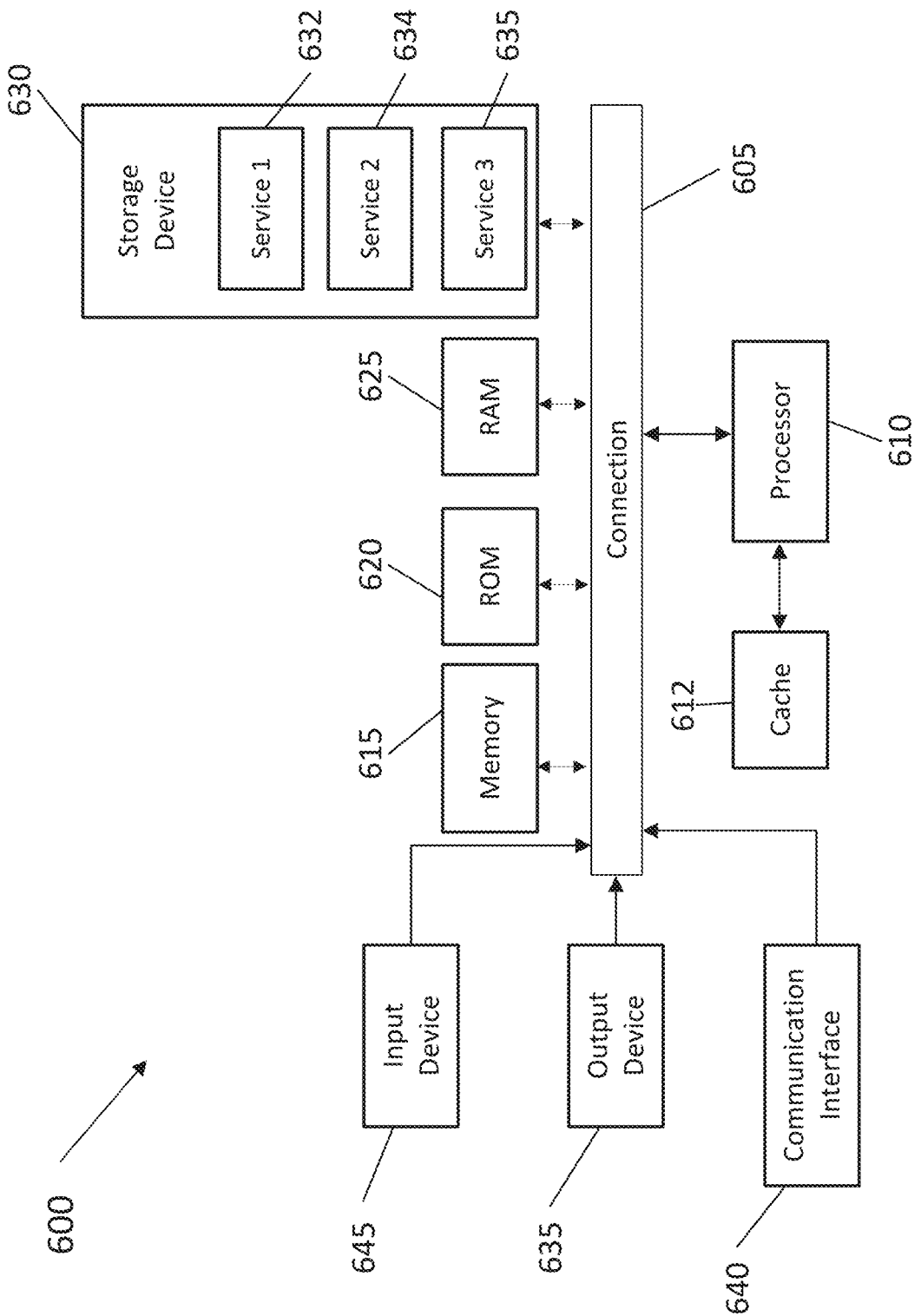
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Illustrative Examples of the Disclosure Include

Aspect 1. A system comprising: at least one memory; and at least one processor coupled to the at least one memory, the at least one processor configured to: determine a location of a first blind spot that is within range of a light detection and ranging (LIDAR) sensor; determine, based on the location of the first blind spot, a first pose for positioning a reflective object that is located proximate to the LIDAR sensor; position the reflective object according to the first pose; trigger the LIDAR sensor to collect sensor data during a scan cycle performed by the LIDAR sensor, wherein at least one portion of a light beam emitted from the LIDAR sensor is reflected off the reflective object at the first pose toward the location of the first blind spot; and receive, at the LIDAR sensor, a reflection of the at least one portion of the light beam emitted from the LIDAR sensor reflected back from the location of the first blind spot via the reflective object at the first pose.

Aspect 2. The system of Aspect 1, wherein the LIDAR sensor is mounted on an autonomous vehicle.

Aspect 3. The system of Aspect 1 or 2, wherein the reflective object is a mirror.

Aspect 4. The system of any of Aspects 1 to 3, wherein the reflective object is attached to a rod.

Aspect 5. The system of any of Aspects 1 to 4, wherein the reflective object comprises at least one non-reflective portion; and the at least one processor is configured to calibrate the first pose of the reflective object based on at least one LIDAR reflection corresponding to the at least one non-reflective portion.

Aspect 6. The system of any of Aspects 1 to 5, wherein to position the reflective object according to the first pose the at least one processor is further configured to: configure a motor that is coupled to the reflective object to position the reflective object according to the first pose.

Aspect 7. The system of any of Aspects 1 to 6, wherein the first blind spot is within an ultra nearfield area proximate an autonomous vehicle.

Aspect 8. The system of any of Aspects 1 to 7, wherein the at least one processor is further configured to: determine a location of a second blind spot that is within range of the LIDAR sensor; determine, based on the location of the second blind spot, a second pose for positioning the reflective object that is located proximate to the LIDAR sensor, wherein at least a portion of a light beam from the LIDAR sensor is reflected off the reflective object at the second pose toward the location of the second blind spot; and position the reflective object according to the second pose.

Aspect 9. A method comprising: determining a location of a first blind spot that is within range of a light detection and ranging (LIDAR) sensor; determining, based on the location of the first blind spot, a first pose for positioning a reflective object that is located proximate to the LIDAR sensor; positioning the reflective object according to the first pose; triggering the LIDAR sensor to collect sensor data during a scan cycle performed by the LIDAR sensor, wherein at least one portion of a light beam emitted from the LIDAR sensor is reflected off the reflective object at the first pose toward the location of the first blind spot; and receiving, at the LIDAR sensor, a reflection of the at least one portion of the light beam emitted from the LIDAR sensor reflected back from the location of the first blind spot via the reflective object at the first pose.

Aspect 10. The method of Aspect 9, wherein the LIDAR sensor is mounted on an autonomous vehicle.

Aspect 11. The method of any of Aspects 9 or 10, wherein the reflective object is a mirror.

Aspect 12. The method of any of Aspects 9 to 11, wherein the reflective object is attached to a rod.

Aspect 13. The method of any of Aspects 9 to 12, wherein the reflective object comprises at least one non-reflective portion; and further comprising: calibrating the first pose of the reflective object based on at least one LIDAR reflection corresponding to the at least one non-reflective portion.

Aspect 14. The method of any of Aspects 9 to 13, wherein positioning the reflective object according to the first pose includes configuring a motor that is coupled to the reflective object to position the reflective object according to the first pose.

Aspect 15. The method of any of Aspects 9 to 14, wherein the first blind spot is within an ultra nearfield area proximate an autonomous vehicle.

Aspect 16. The method of any of Aspects 9 to 15, further comprising: determining a location of a second blind spot that is within range of the LIDAR sensor; determining, based on the location of the second blind spot, a second pose for positioning the reflective object that is located proximate to the LIDAR sensor, wherein at least a portion of a light beam from the LIDAR sensor is reflected off the reflective object at the second pose toward the location of the second blind spot; and positioning the reflective object according to the second pose.

Aspect 17. A non-transitory computer-readable storage medium comprising at least one instruction for causing a computer or processor to: determine a location of a first blind spot that is within range of a light detection and ranging (LIDAR) sensor; determine, based on the location of the first blind spot, a first pose for positioning a reflective object that is located proximate to the LIDAR sensor; position the reflective object according to the first pose; trigger the LIDAR sensor to collect sensor data during a scan cycle performed by the LIDAR sensor, wherein at least one portion of a light beam emitted from the LIDAR sensor is reflected off the reflective object at the first pose toward the location of the first blind spot; and receive, at the LIDAR sensor, a reflection of the at least one portion of the light beam emitted from the LIDAR sensor reflected back from the location of the first blind spot via the reflective object at the first pose.

Aspect 18. The non-transitory computer-readable storage medium of any of Aspects 17, wherein the LIDAR sensor is mounted on an autonomous vehicle.

Aspect 19. The non-transitory computer-readable storage medium of any of Aspects 17 or 18, wherein the reflective object is a mirror.

Aspect 20. The non-transitory computer-readable storage medium of any of Aspects 17 to 19, further comprising: determining a location of a second blind spot that is within range of the LIDAR sensor; determining, based on the location of the second blind spot, a second pose for positioning the reflective object that is located proximate to the LIDAR sensor, wherein at least a portion of a light beam from the LIDAR sensor is reflected off the reflective object at the second pose toward the location of the second blind spot; and positioning the reflective object according to the second pose.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A system comprising:
   at least one memory; and
   at least one processor coupled to the at least one memory, the at least one processor configured to:
   determine a location of a first blind spot that is within range of a light detection and ranging (LIDAR) sensor;
   determine, based on the location of the first blind spot, a first pose for positioning a reflective object that is located proximate to the LIDAR sensor;
   position the reflective object according to the first pose;
   trigger the LIDAR sensor to collect sensor data during a scan cycle performed by the LIDAR sensor, wherein at least one portion of a light beam emitted from the LIDAR sensor is reflected off the reflective object at the first pose toward the location of the first blind spot; and
   receive, at the LIDAR sensor, a reflection of the at least one portion of the light beam emitted from the LIDAR sensor reflected back from the location of the first blind spot via the reflective object at the first pose.

2. The system of claim 1, wherein the LIDAR sensor is mounted on an autonomous vehicle.

3. The system of claim 1, wherein the reflective object is a mirror.

4. The system of claim 1, wherein the reflective object is attached to a rod.

5. The system of claim 1, wherein the reflective object comprises at least one non-reflective portion; and the at least one processor is configured to calibrate the first pose of the reflective object based on at least one LIDAR reflection corresponding to the at least one non-reflective portion.

6. The system of claim 1, wherein to position the reflective object according to the first pose the at least one processor is further configured to:
   configure a motor that is coupled to the reflective object to position the reflective object according to the first pose.

7. The system of claim 1, wherein the first blind spot is within an ultra nearfield area proximate an autonomous vehicle.

8. The system of claim 1, wherein the at least one processor is further configured to:
   determine a location of a second blind spot that is within range of the LIDAR sensor;
   determine, based on the location of the second blind spot, a second pose for positioning the reflective object that is located proximate to the LIDAR sensor, wherein at least a portion of a light beam from the LIDAR sensor is reflected off the reflective object at the second pose toward the location of the second blind spot; and
   position the reflective object according to the second pose.

9. A method comprising:
   determining a location of a first blind spot that is within range of a light detection and ranging (LIDAR) sensor;
   determining, based on the location of the first blind spot, a first pose for positioning a reflective object that is located proximate to the LIDAR sensor;
   positioning the reflective object according to the first pose;
   triggering the LIDAR sensor to collect sensor data during a scan cycle performed by the LIDAR sensor, wherein at least one portion of a light beam emitted from the LIDAR sensor is reflected off the reflective object at the first pose toward the location of the first blind spot; and
   receiving, at the LIDAR sensor, a reflection of the at least one portion of the light beam emitted from the LIDAR sensor reflected back from the location of the first blind spot via the reflective object at the first pose.

10. The method of claim 9, wherein the LIDAR sensor is mounted on an autonomous vehicle.

11. The method of claim 9, wherein the reflective object is a mirror.

12. The method of claim 9, wherein the reflective object is attached to a rod.

13. The method of claim 9, wherein the reflective object comprises at least one non-reflective portion; and further comprising:
   calibrating the first pose of the reflective object based on at least one LIDAR reflection corresponding to the at least one non-reflective portion.

14. The method of claim 9, wherein positioning the reflective object according to the first pose includes configuring a motor that is coupled to the reflective object to position the reflective object according to the first pose.

15. The method of claim 9, wherein the first blind spot is within an ultra nearfield area proximate an autonomous vehicle.

16. The method of claim 9, further comprising:
   determining a location of a second blind spot that is within range of the LIDAR sensor;
   determining, based on the location of the second blind spot, a second pose for positioning the reflective object that is located proximate to the LIDAR sensor, wherein at least a portion of a light beam from the LIDAR sensor is reflected off the reflective object at the second pose toward the location of the second blind spot; and
   positioning the reflective object according to the second pose.

17. A non-transitory computer-readable storage medium comprising at least one instruction for causing a computer or processor to:
   determine a location of a first blind spot that is within range of a light detection and ranging (LIDAR) sensor;
   determine, based on the location of the first blind spot, a first pose for positioning a reflective object that is located proximate to the LIDAR sensor;
   position the reflective object according to the first pose;
   trigger the LIDAR sensor to collect sensor data during a scan cycle performed by the LIDAR sensor, wherein at least one portion of a light beam emitted from the LIDAR sensor is reflected off the reflective object at the first pose toward the location of the first blind spot; and
   receive, at the LIDAR sensor, a reflection of the at least one portion of the light beam emitted from the LIDAR sensor reflected back from the location of the first blind spot via the reflective object at the first pose.

18. The non-transitory computer-readable storage medium of claim 16, wherein the LIDAR sensor is mounted on an autonomous vehicle.

19. The non-transitory computer-readable storage medium of claim 17, wherein the reflective object is a mirror.

20. The non-transitory computer-readable storage medium of claim 17, further comprising:
   determining a location of a second blind spot that is within range of the LIDAR sensor;
   determining, based on the location of the second blind spot, a second pose for positioning the reflective object that is located proximate to the LIDAR sensor, wherein at least a portion of a light beam from the LIDAR sensor is reflected off the reflective object at the second pose toward the location of the second blind spot; and
   positioning the reflective object according to the second pose.

* * * * *